United States Patent [19]

Settembrini

[11] Patent Number: 4,744,937
[45] Date of Patent: May 17, 1988

[54] METHOD FOR PRODUCING CONTAINERS FROM EXTRUDED AND BLOW-MOLDED PLASTIC MATERIAL

[76] Inventor: Antoine D. Settembrini, Le Lubrier, 84480 Bonnieux, France, 84480

[21] Appl. No.: 718,204

[22] Filed: Apr. 2, 1985

Related U.S. Application Data

[63] Continuation of Ser. No. 390,764, Jun. 21, 1982, abandoned.

[30] Foreign Application Priority Data

Jun. 26, 1981 [FR] France .................. 81 12634

[51] Int. Cl.⁴ .............. B29C 49/18; B29C 49/68; H05B 3/40
[52] U.S. Cl. ............................ 264/521; 264/520; 264/530; 264/535
[58] Field of Search .......... 264/520, 521, 523, 530, 264/532, 535, 537, 538, 540–543, 25; 425/526

[56] References Cited

U.S. PATENT DOCUMENTS

| | | | |
|---|---|---|---|
| 3,283,046 | 11/1966 | De Witt | 264/526 |
| 3,979,491 | 9/1976 | Zavasnik | 425/526 X |
| 4,036,927 | 7/1977 | Stolki | 264/521 |
| 4,070,428 | 1/1978 | Krall et al. | 264/530 |
| 4,116,606 | 9/1978 | Valyi | 425/526 |
| 4,141,680 | 2/1979 | Kauffman et al. | 425/529 |
| 4,219,526 | 8/1980 | Mehnert | 264/521 X |
| 4,224,263 | 9/1980 | Kontz | 264/521 X |
| 4,352,777 | 10/1982 | Valyi | 264/530 X |
| 4,355,968 | 10/1982 | Lagoutte et al. | 425/526 |

FOREIGN PATENT DOCUMENTS

| | | |
|---|---|---|
| 1704134 | 11/1972 | Fed. Rep. of Germany . |
| 1307954 | 9/1962 | France . |
| 83224 | 5/1964 | France . |
| 1430899 | 1/1966 | France . |
| 2419810 | 3/1979 | France . |

*Primary Examiner*—Jan H. Silbaugh
*Assistant Examiner*—Neil Michael McCarthy
*Attorney, Agent, or Firm*—Lewis H. Eslinger

[57] ABSTRACT

Method for producing containers such as for example bottles, from extruded and blow-molded plastic material, including bringing a tubular preform closed at its upper end and of which the outer surface of the wall is brought to a temperature of at least 140° C., to a station where the containers are shaped by extrusion and blow-molding, after cooling down the said preform to a temperature around 118° C. The cooling down of the preform, from its initial temperature before it reaches the container shaping station is controlled, first by the ambient atmosphere (a,b,c) then in a plurality of enclosures (d to k), closed at their upper end, in each one of which heat is supplied on the outer surface of the preform in order to obtain, at the exit from the last enclosure, as even a temperature as possible around 118° C. through the thickness of the preform wall.

2 Claims, 5 Drawing Sheets

METHOD FOR PRODUCING CONTAINERS FROM EXTRUDED AND BLOW-MOLDED PLASTIC MATERIAL

This is a continuation of application Ser. No. 06/390,764, filed June 21, 1982, now abandoned.

The production of containers in plastic material, such as for example bottles, requires a highly automated installation, which carries out, without people intervening, the different phases of the method. It is in particular known as advantageous to use as a basis, preforms obtained by extrusion and blow-molding, or by any other means. Said preforms, which are sorts of cylindrical blanks, closed at one of their ends, are heated up to a suitable temperature, and more specifically to temperatures varying along the preform. They are then extruded and blow-molded in molds of suitable shape. After this operation, the finished container has to be adequately cooled before it is handled for storing purposes, or to be taken to a filling station.

To enable an accurate shaping of the container, the temperature of the preform should be as homogenous as possible when it is introduced into the mold. To be more precise, the temperature of the preform should be around 118°, not only on the inner and outer surfaces of its wall which will be subjected to the extruding and blowing operations (bi-axial stretching) but also and especially through the thickness of said wall.

In most of the known techniques, and in particular in French Pat. Nos. 1 307 954, 88 224, 1 430 899 and 2 419 810, as well as in U.S. Pat. Nos. 3,283,046 and 4,141,680, the preform which at first is at room temperature, is heated up in an oven to a suitable temperature before being introduced into the shaping mold. This prior technique however does not permit to easily obtain a homogeneous temperature through the entire thickness of the wall, and the time needed to produce one container is relatively long.

In U.S. Pat. No. 4,219,526 to Mehnert, immediately after the production of the preforms by blow-molding of a hot parison, the preforms are cooled down to a temperature close to the glass transition temperature of the material. The blank temperature is then tempered before the preform is blow-molded into the final container. However, the tempering of the blank temperature is achieved by cooled or heated air and cannot be easily controlled.

It is a first object of the present invention to propose a method for producing plastic containers from suitably heated preforms and in particular for obtaining rapidly a homogeneous temperature of the wall of the preforms before these are introduced in the container shaping molds.

In accordance with the present invention, a method for stepwise producing containers such as bottles or the like of extruded and blow-molded plastic material comprises a first step of producing preforms by blow-molding a hot parison in a cooled mold so that the average mass temperature of the preforms is at least a first temperature, a second step of cooling down, preferably by contact with the ambient atmosphere, the outer surface of each of the preforms to around a second temperature, and a third step of the tempering the preforms immediately followed by the blow-molding of each of the preforms into a container, the third step including subjecting the outer surface of the preform to a plurality of successively controlled supplies of radiated heat, the amount of the heat supplied being defined in relation to an estimated temperature gradient and the thickness of the preform wall, for any horizontal section thereof, in order to obtain as even a temperature as possible about the second temperature throughout the thickness of the preform wall.

The number of supplies of radiated heat is of course related to the dwelling time of one preform in each one, and that time can be very short, such as 5 seconds or even less. It is in fact determined by the time needed to shape a container, this in turn depending on the working characteristics of the container-shaping mold and on the efficiency of its cooling device.

Owing to these dispositions, the production of plastic containers can easily be mechanized from the extrusion of the tubular parison to the receipt of the finished containers, and the rate of production of the containers can be very high.

A further object of the invention is a machine for carrying out the method defined hereinabove, which machine enables to benefit from all the advantages presented by said method and to keep up a high rate of production.

To this effect, it is known that most of the currently existing machines are not mechanized to perform all the operations required by the production of plastic containers. A plurality of successive machines are often necessary, with intermediate help from people, which could entail risks of pollution especially in the case of containers designed to receive food products.

The invention therefore relates also to a machine which is entirely self-operating from the extrusion of the parison and its blow-molding into a preform, to the discharge of the finished container towards a storage or utilizing station. The preforms are thus brought automatically to the different stations of the machine; this contributing to further increasing the rate of production and the quality.

The machine according to the invention comprises in known manner, a continuous transfer chain, some links of which support vertical pins which constitute the preform-receiving members, which transfer chain moves horizontally under the action of a stepwise drive mechanism. The pins are thus brought successively, first into a cooling device which is controlled by heating members, then into a shaping device, and finally into a device receiving the finished containers, all said devices being distributed in that order along the closed course followed by the continuous transfer chain.

The preforms are positioned on the receiving pins by gravity, the open part of the preform being directed downwards when it is lowered on the pin over which it is brought. Conceivably, the preforms can be dropped onto the pins at their exit from an extruding and blow-molding machine of which the mold delivers preforms whose aperture faces downwards.

According to an important characteristic of the invention, the controlled cooling device is constituted by a plurality of controlled supplies of radiated heat, comprising bell-shaped enclosures, substantially cylindrical and vertical, closed at their upper end and mounted on a support sliding vertically according to a reciprocal movement over a range at least equal to the height of the receiving pins above the continuous transfer chain.

The invention will be more readily understood on reading the following description with reference to the accompanying drawings, in which.

Figure 1:
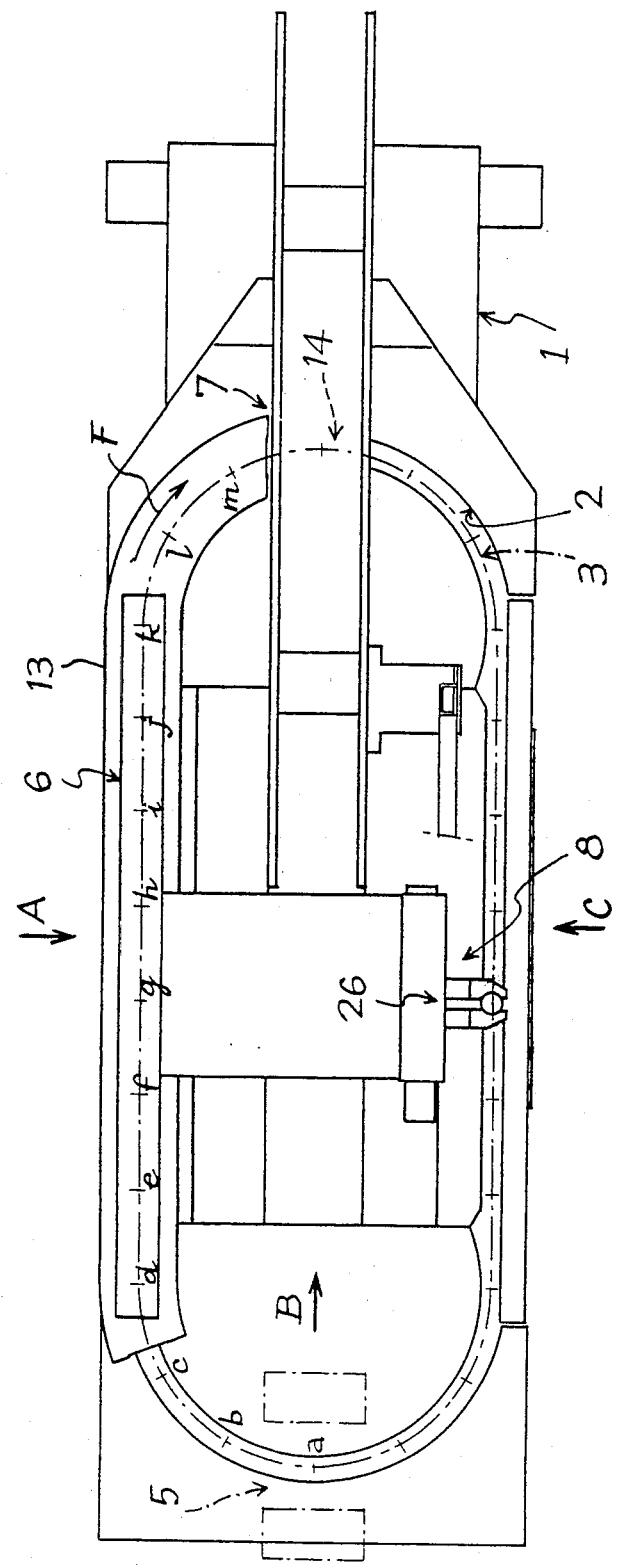
FIG. 1 is a diagrammatical plan view of the machine.
Figure 2:
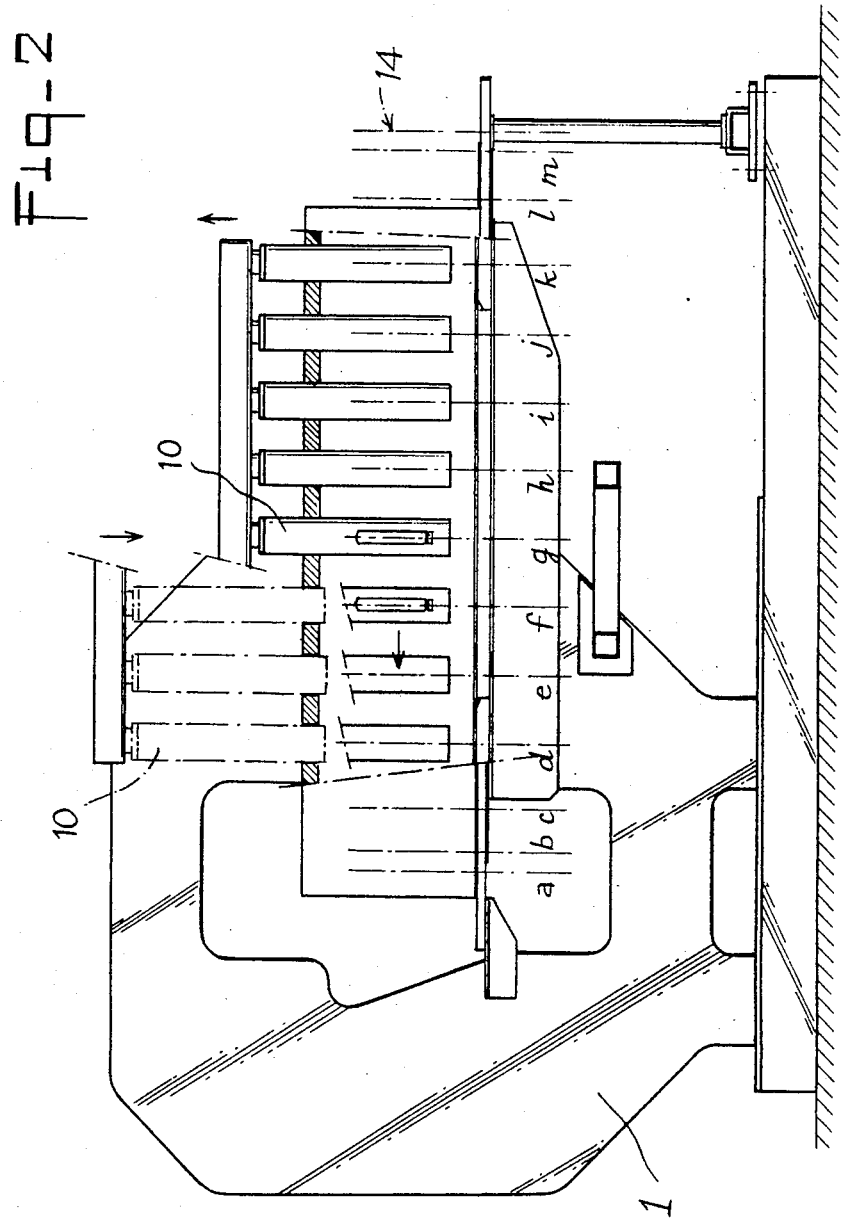
FIG. 2 is an elevational view along arrow A of FIG. 1.
Figure 3:
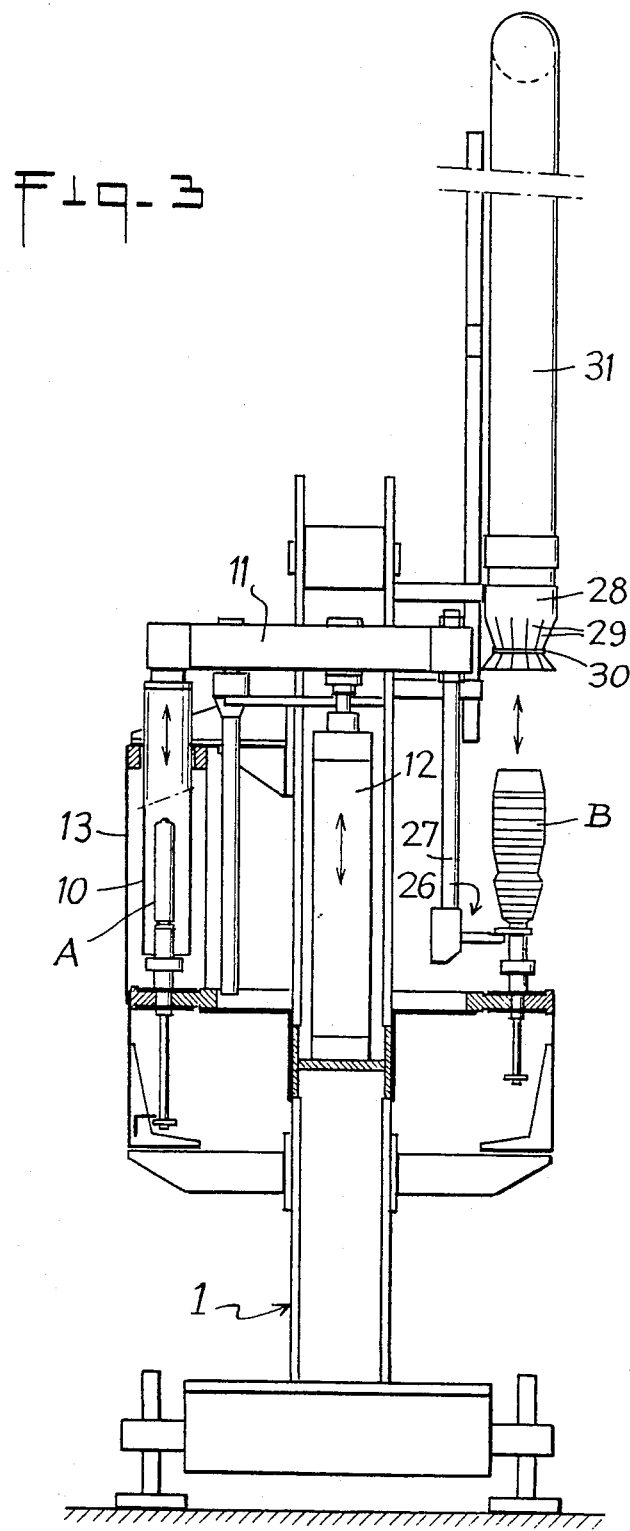
FIG. 3 is an elevational view along arrow B of FIG. 1.
Figure 4:
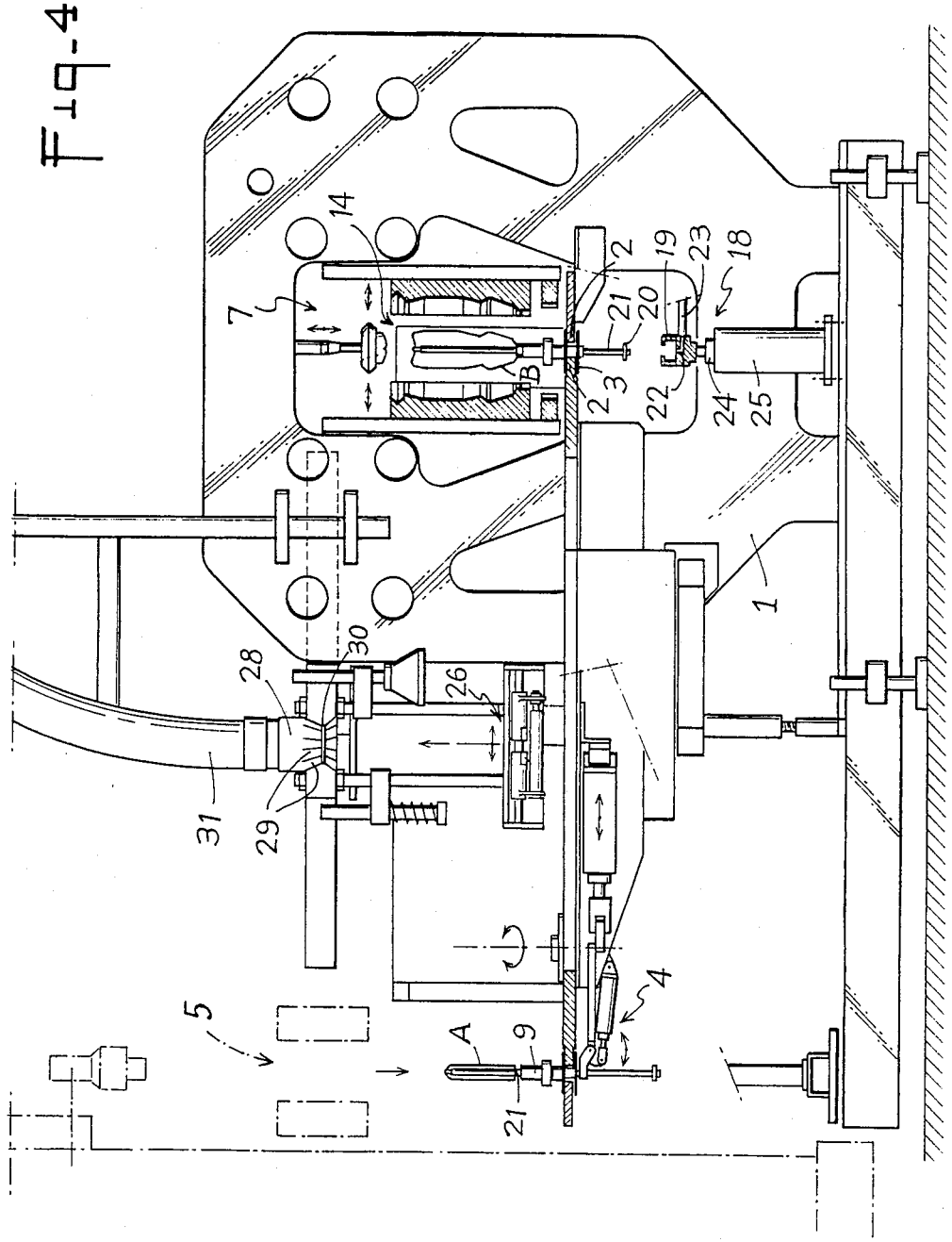
FIG. 4 is an elevational view along arrow C of FIG. 1.

Referring to the drawings, the machine according to the invention comprises a frame 1 presenting a guiding path 2 for a conveyor chain 3 following a continuous course, in the direction of arrow F, under the action of a stepwise mechanism 4 (FIG. 4).

After a first station receiving the preforms and generally designated as 5, there follows a controlled cooling device 6, a shaping device 7 and the device 8 receiving the finished containers.

On some links of the conveyor chain 3, and preferably in the middle of these links, are fitted supports 9 for sliding pins 21, one part at least of which extends vertically above the plane of the conveyor chain.

The controlled cooling device 6 is essentially composed of a plurality of substantially cylindrical and vertical bell-shaped heating elements 10. The upper end of said elements is closed whereas their lower end is open. Said heating bells are secured on a support 11 mounted for vertical sliding with respect to the frame 1. A hydraulic or pneumatic jack 12 is, on the one hand, secured to the frame 1, and on the other hand coupled to one of the elements of the support 11. Said jack enables, in conditions to be specified hereinafter, a reciprocal vertical movement of the support 11.

Said heating bells 10 are equipped on the inside with electrical elements permitting to obtain any required temperature. It should however be pointed out that it is advantageous to be able to regulate the temperature in one bell independently of the temperature regulated in the next bell. Moreover, it will be further advantageous to distribute sensibly the heating zones and, as a result, the temperature zones, in relation to the position with respect to one of the ends of the bell. It is indeed known that some containers, and in particular certain areas of those containers, need to be subjected to a bi-axial stretching when they are being shaped, this necessitating a very accurate distribution of the temperatures along the preform. The precise role of the heating bells in controlling the cooling of the preforms will be explained hereinafter.

Preferably, the assembly of heating bells 10 moves inside an insulated casing 13, which insulates them from heat at least when they are in the lowered position.

Adjacent the outlet of the controlled device 6, is situated the shaping device 7. This essentially comprises a mold 14, in three parts, as can be seen in FIG. 4. The two lower parts of the mold are shaped to correspond to the shapes of the container walls and of its orifice; said lower parts are coupled to a conventional toggle mechanism, not shown.

The shaping device 7 is coupled to a blow-molding device designated by the general reference 18. It is essentially composed of a head 19 adapted to receive the correspondingly-shaped endpiece 20 of the lower end of a hollow pin 21 mounted for sliding on its support 9. In said head 19 is provided a conduit 22 adapted to be connected with a source of compressed air via pipe 23. When said head 19 is resting on the endpiece 20, the conduit 22 communicates tightly with the inside of the hollow pin 21 the upper end of which is rounded and provided with at least one orifice issuing outside the pin.

The head 19 is mounted at the upper end of the movable element 24 of a jack 25 fitted on the frame, co-axially to the mold 14 in its closing position.

Next to the shaping device 7 and still on the path followed by the conveyor chain 3 along arrow F, is situated the device receiving the finished containers.

Said device essentially comprises a mechanism for removing the containers constituted in the illustrated example by a clamp 26 situated above the conveyor chain in the area where, as will become obvious hereinafter, is situated the orifice of the finished container to be removed from the pin 21 supporting it.

The support 27 of the clamp 26 is mounted for sliding vertically with respect to the frame of the machine over a range at least equal to the height of a finished container. A drive mechanism ensures the reciprocal movement of said support 27.

But, preferably, and as shown in the drawings, the support 27 of the clamp 26 is integral with the support 11 of the heating bells. The jack 12 therefore ensures its reciprocal movement in conditions to be specified hereinafter.

Vertically to the gripping zone of the clamp 26, there is provided a gullet 28 of which the inlet faces downwards. Said gullet, in which the finished containers are introduced, is equipped with a braking device preventing the containers from falling under their own weight. The gullet in the illustrated example is constituted, to this effect, by a plurality of flexible strips 29 defining a passage of diameter smaller than the external diameter of a container. Preferably, an elastic ring 30 cooperates with the flexible strips to keep a narrow passage at the inlet to the gullet 28. This latter is on the other hand extended upwards by a tube 31 of inner diameter substantially greater than the external diameter of the finished containers. The path of the tube 31 thereafter presents adequate sinuosities to bring the containers that it conveys, towards a storage or filling station.

The machine according to the invention operates as follows:

The conveyor chain 3 being driven stepwise by its mechanism 4, a preform A is placed over each pin 21. As indicated hereinabove, the preform falls by gravity from a preform producing apparatus, of the extrusion and blow-molding type. It is however essential that this apparatus delivers preforms of which the lower end is open, their upper end being closed. When it falls on the pin 21, the temperature of the preform on the external surface of its wall is at least equal to 140° C. Such a temperature can be due in particular to the existence of a cooling device inside the preform mold shaping the preforms by extrusion and blow-molding. The temperature of the tubular parison supplying this mold is generally about 180° C. when a preform mold is made of polyvinylchloride (PVC) as described herein. It is to be appreciated that materials other then PVC can be used in accord with the present invention, and that other specific temperatures would apply to such materials, as is evident to one of ordinary skill in the art.

The preform A is then taken by the pin 21 over which it is fitted, into the controlled cooling device 6. During the movement of the conveyor chain 3, the support 11 of the heating bells 10 is held in a high position by its jack 12. As soon as the preform A has reached a vertical position with respect to the first bell 10, the jack 12 lowers down the support 11 and the first bell in turn comes over the preform A. After a suitable interval of time, a few seconds for example, the jack 12 lifts back all the heating bells. The path is then cleared for the preforms and the conveyor chain 3 can bring preform A under the second bell 10. The cycle continues until the preform A has reached the last bell.

Figure 5:
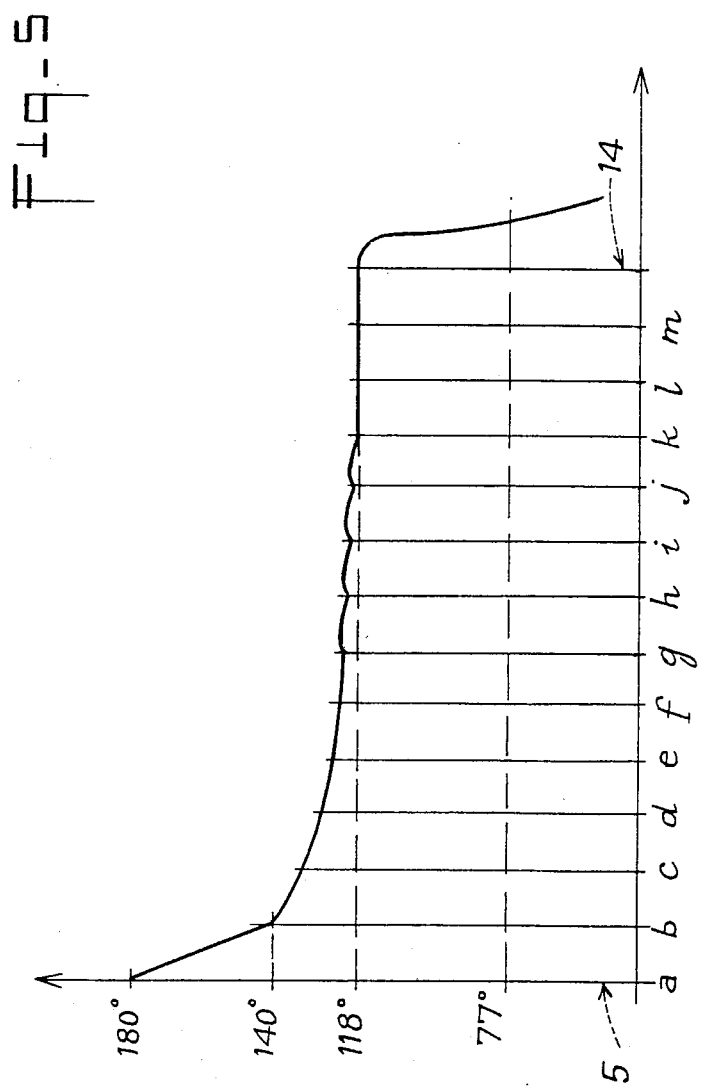
FIG. 5 is a diagram showing the curve of the temperature of the outer surface of a preform, in a cross-section determined in relation to time, i.e. including its position within the cycle of the machine.

Before entering the container-shaping phase, the role played by the heating bells 10 should be specified, said bells in effect constituting a preform controlled-cooling means. Reference will be made particularly, to this effect, to FIG. 5; it is assumed in the diagrammatical representation, that the passage from a position n to a position n+1 will be instantaneous when the preform has reached its lowest temperature at the position n.

As indicated hereinabove, the skin (temperature or temperature of the outer surface of the wall) of a preform is at least equal to 140° C. when said preform reaches a pin 21 (position c). In the case of the machine described herein, said temperature is that obtained when cooling the preform-shaping mold 5.

However, the temperature on the inner surface of the wall is then greater than 140° C. and in the center of said wall the temperature has remained around the extrusion temperature, namely around 180° C.

There is therefore an heterogeneousness of the temperatures through the thickness of the wall which it is necessary to reduce if not altogether eliminate, before reaching the container-shaping phase, which should take place at around 118° C.

In a first stage, up to position c, the preform is transported in the open, and its skin temperature is reduced to about 125° C. However, the temperature gradient through the thickness remains high.

From position d to position m inclusive, the preform enters the controlled-cooling device 6 in which it is successively covered over by each one of the eight bells 10 described hereinabove (positions d to k).

The first eight bells, for example those in position d, e and f, will limit the cooling down of the outer skin temperature, whilst adequately cooling down, mainly by convection, the inner temperature of the wall. The temperature difference between the two, outer and inner, surfaces of the wall tends to reduce, if not disappearing completely, whereas the temperature of these surfaces remains substantially under the final temperature.

Nevertheless, the temperature in the middle of the thickness of the wall is still too high and it should be adequately reduced before shaping the container.

This will be done by the next set of bells, for example by those occupying the positions g, h, i, j and k.

The bell-shaped heating devices in the positions g, h, i and j account for the outline of the next container and ensure a supply of heat by convention and radiation. The temperature is thus further lowered, but what is more, the desired reduction of the temperature gradient between the skin (inner or outer) and the middle of the wall thickness, is obtained.

Finally, the last bell (position k) and the transfer to positions 1 and m, situated in the insulated casing 13 enable to ensure a "smoothing out" of the temperatures which are then around 118° C.

The cooling operated in the device 6 is therefore relatively long and many parameters are available to obtain the desired result, especially in relation to the plastic material used and to the shape of the final container. This does not prevent the production rate from being high, for example 750 containers per hour, said production rate being solely dependent on the time (which is about a few seconds) during which a preform stays in a specific position.

On coming out of the insulated casing 13, the preform goes directly into the shaping mold 14. Said latter is of course open whilst the conveyor chain is moving, but it closes as soon as said chain stops.

When the pin 21 which carries the preform A has arrived within the vertical axis of the mold 14, its lower endpiece 20 engages by translation, the head 19 of the blow-molding device. The pin 21 is therefore fast, in vertical translation, with the movable element 24 of the jack 25.

As soon as the mold 14 closes, the jack 25 raises the pin 21 which slides inside its support 9, whereas its rounded upper end pulls the upper end of the preform to any suitable heights, to rest for example on the upper wall of the mold. Said axial drawing is possible since, when the mold closes, it grips firmly the lower end of the preform on the support 9, immobilizing it vertically.

At the same time as the preform is drawn axially, the pipe 23 supplies compressed air to the orifice at the upper end of the pin 21 via conduit 22 connected in sealed manner with the space inside the pin 21. The preform is then blow-molded and pushed back against the walls of the mold where it is simultaneously shaped and cooled.

The shaping operations being over, the mold 14 opens, clearing a passage for the pin 21 carrying a finished container B. Simultaneously, the jack 25 starts descending, releasing the endpiece 20 from the head 19 and allowing said endpiece to come out from said head as soon as the conveyor chain 3 moves.

The pin 21 is then brought in stepwise manner, to the finished containers receiving device. The container continues to cool during the transfer.

When the pin 21 arrives with its container B to a position vertically to the gullet 28, the clamp 26 and its support 27 are in a high position, the jaws of the clamp being open. As soon as the conveyor chain stops, the jack 12 lowers the support 27 and its clamp 26, the jaws of which close over the lower end of the container B, around the orifice thereof.

When the support 27 goes up again, the clamp 26 carries away the container B by removing it from the pin 21. The bottom of the container B then arrives at the inlet to the gullet 28 and pushes back the orifice of the container previously set in and immobilized by the braking device of the gullet. At the end of the upwards movement of the support 27, the container B has taken over the place of the preceding one and is in turn immobilized under the pressure of the flexible strips 29 and of the ring 30. The jaws of the clamp 26 finally open and the container-removing device is then ready to pick up the next finished container. Thus, the train of finished containers move in stepwise manner in the tube 31 as far as the utilizing station without any risk of pollution.

The pin 21, clear of its container, returns in stepwise manner to the preform receiving station. On its course, the endpiece 20 meets up with a guide member secured to the frame guiding the lowering of the pin 21 completely down in its support 9, so that said pin is ready to receive another preform.

What is claimed is:

1. Method for stepwise producing containers of extruded and blow-molded plastic material, comprising:

a first step of producing preforms having outer cylindrical surfaces by blow-molding hot parisons in a cooled mold so that the average mass temperature of said preforms is at a first temperature;

a second step of cooling down, by contact with the ambient atmosphere, the outer surface of each of said preforms to around a second temperature;

a third step of tempering said preforms by subjecting the entire outer cylindrical surface of each of said preforms to a plurality of successive controlled supplies of radiated heat, said supplies comprising substantially cylindrical bell-shaped heating elements each mounted for reciprocal vertical movement, each of the elements being successively lowered over each of said preforms for a suitable interval of time, the amount of said heat supplied being defined in relation to an estimated temperature gradient in the thickness of a cylindrical wall of said preform, for any horizontal section thereof, in order to obtain as even a temperature as possible about said second temperature throughout the thickness of said preform wall; and a fourth step immediately following said third step of blow-molding each of said preforms into a container.

2. The method of claim 1; wherein said plurality of successive controlled supplies of heat is eight.

* * * * *